United States Patent
Yang et al.

(10) Patent No.: US 8,823,719 B2
(45) Date of Patent: Sep. 2, 2014

(54) GRAPHICS PROCESSING METHOD APPLIED TO A PLURALITY OF BUFFERS AND GRAPHICS PROCESSING APPARATUS THEREOF

(75) Inventors: Chin-Jung Yang, Hsinchu (TW); Guoping Li, Hefei (CN)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1060 days.

(21) Appl. No.: 12/779,063

(22) Filed: May 13, 2010

(65) Prior Publication Data

US 2011/0279463 A1  Nov. 17, 2011

(51) Int. Cl.
G06T 11/40 (2006.01)
G06T 1/60 (2006.01)
G09G 5/36 (2006.01)
G09G 5/397 (2006.01)
G09G 5/399 (2006.01)

(52) U.S. Cl.
CPC *G06T 1/60* (2013.01); *G09G 5/397* (2013.01); *G09G 5/363* (2013.01); *G09G 5/399* (2013.01)
USPC .......................................................... 345/522

(58) Field of Classification Search
USPC ........................................................ 345/522
See application file for complete search history.

(56) References Cited

U.S. PATENT DOCUMENTS

| | | | | |
|---|---|---|---|---|
| 5,321,809 A * | 6/1994 | Aranda | 345/570 |
| 5,392,396 A * | 2/1995 | MacInnis | 345/543 |
| 5,511,165 A * | 4/1996 | Brady et al. | 709/216 |
| 5,655,112 A * | 8/1997 | MacInnis | 345/501 |
| 5,724,560 A * | 3/1998 | Johns et al. | 345/539 |
| 5,794,037 A * | 8/1998 | Young | 718/108 |
| 5,796,413 A * | 8/1998 | Shipp et al. | 345/522 |
| 5,818,464 A * | 10/1998 | Wade | 345/501 |
| 5,969,728 A * | 10/1999 | Dye et al. | 345/553 |
| 6,504,547 B1 * | 1/2003 | Mercer | 345/503 |
| 6,822,659 B2 * | 11/2004 | Marion et al. | 345/629 |
| 6,844,879 B2 * | 1/2005 | Miyauchi | 345/502 |
| 6,894,693 B1 * | 5/2005 | Nash | 345/552 |
| 6,911,985 B1 * | 6/2005 | Fujimoto | 345/539 |
| 8,120,620 B2 * | 2/2012 | Yamauchi | 345/620 |
| 8,169,436 B2 * | 5/2012 | Rivera et al. | 345/419 |
| 2002/0113788 A1 | 8/2002 | Bruijns | |
| 2002/0126122 A1 * | 9/2002 | Yet et al. | 345/522 |
| 2006/0092163 A1 * | 5/2006 | Kuo et al. | 345/522 |
| 2010/0020088 A1 * | 1/2010 | Harumoto | 345/522 |

FOREIGN PATENT DOCUMENTS

EP  0 752 695 B1  10/2000
EP  1 360 650  11/2003

* cited by examiner

*Primary Examiner* — Xiao Wu
*Assistant Examiner* — Hoai Le
(74) *Attorney, Agent, or Firm* — Winston Hsu; Scott Margo (57) ABSTRACT

A graphics processing method, which is applied to a plurality of buffers at least including a first buffer served as an on-screen buffer and a second buffer served as an on-drawing buffer, includes the steps of: sending a drawing command related to the second buffer to a drawing engine; when the drawing command related to the second buffer are received, drawing graphic data stored in the second buffer; sending an asynchronous flush command related to the second buffer to the drawing engine in order to confirm whether the drawing command related to the second buffer is completed; flushing the second buffer; and after the second buffer is flushed, sending a first notice signal to notify a display engine that the second buffer is capable of being flipped.

24 Claims, 11 Drawing Sheets

GRAPHICS PROCESSING METHOD APPLIED TO A PLURALITY OF BUFFERS AND GRAPHICS PROCESSING APPARATUS THEREOF

BACKGROUND

The present disclosure relates to a graphics processing method applied to a plurality of buffers and a related graphics processing apparatus, and more particularly, to a graphics processing method applied to a plurality of buffers and a related graphics processing apparatus using asynchronous flush/flip commands.

For a graphics processing apparatus, such as a television or a BD player, a conventional double-buffer procedure or a conventional triple-buffer procedure is usually adopted for drawing and displaying graphic data stored in buffers. As an illustration, in the conventional double-buffer procedure, a processor sends asynchronous flip command to a display engine in order to display graphic data in a buffer on a screen. However, a callback mechanism is required before flipping the buffer, and thus the processor needs to wait for the callback, wasting time. As a result, the processor will be jammed and is unable to send following commands.

Hence, how to improve the performance of the graphics processing apparatus has become an important issue to be solved by designers in this field.

SUMMARY

It is an objective of the claimed disclosure to provide a graphics processing method applied to a plurality of buffers and a related graphics processing apparatus to solve the above-mentioned problems.

According to an embodiment of the present disclosure, a graphics processing method applied to a plurality of buffers is provided. The plurality of buffers includes at least a first buffer served as an on-screen buffer and a second buffer served as an on-drawing buffer. The method includes the steps of: sending a drawing command related to the second buffer to a drawing engine; when the drawing command related to the second buffer is received, drawing graphic data stored in the second buffer; sending an asynchronous flush command related to the second buffer to the drawing engine in order to confirm whether the drawing command related to the second buffer is completed; flushing the second buffer; and after the second buffer is flushed, sending a first notice signal to notify a display engine that the second buffer is capable of being flipped.

According to another embodiment of the present disclosure, a graphics processing apparatus is provided. The graphics processing apparatus includes a plurality of buffers, a processor, a drawing engine, and a display engine. The plurality of buffers includes at least a first buffer served as an on-screen buffer and a second buffer served as an on-drawing buffer. The processor is arranged to send drawing command related to the second buffer, and arranged to send an asynchronous flush command related to the second buffer in order to confirm whether the drawing command related to the second buffer is completed. The drawing engine is coupled to the buffers and the processor, for drawing graphic data stored in the second buffer when the drawing command related to the second buffer is received, for flushing the second buffer, and for sending a first notice signal to notify the display engine that the second buffer is capable of being flipped. The display engine is coupled to the buffers, the processor and the drawing engine, for receiving the first notice signal from the drawing engine. In one embodiment, a number of the plurality of buffers is equal to two; in another embodiment, a number of the plurality of buffers is greater than two.

According to an embodiment of the present disclosure, a graphics processing method applied to a plurality of buffers is provided. The plurality of buffers includes at least a first buffer served as an on-screen buffer and a second buffer served as an on-drawing buffer and a drawing engine. The method includes the steps of: receiving a drawing command related to the second buffer; drawing graphic data stored in the second buffer; receiving an asynchronous flush command related to the second buffer in order to confirm whether the drawing command related to the second buffer is completed; sending a first notice signal according to the confirming result.

These and other objectives of the present disclosure will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
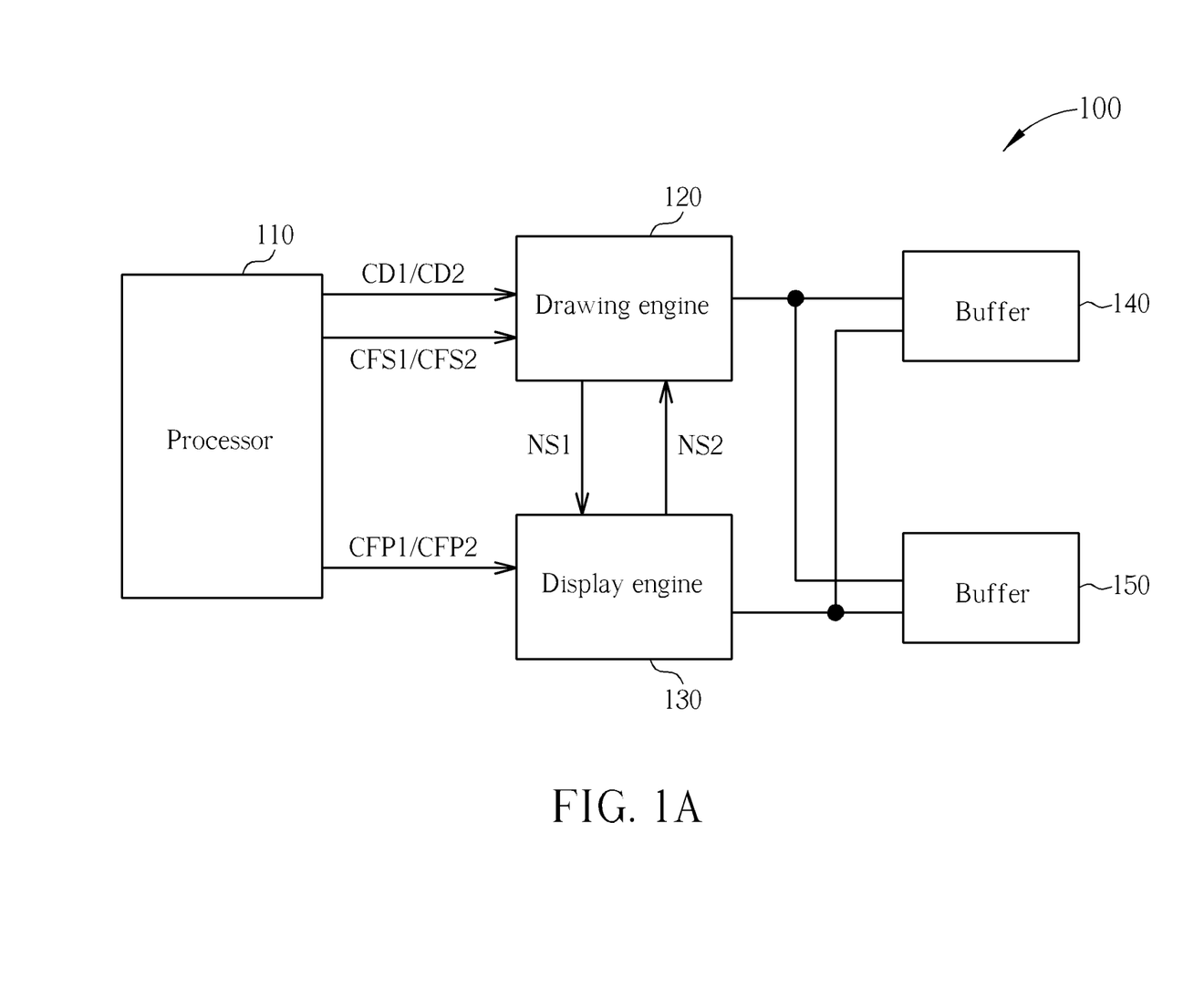
FIG. 1A is a block diagram illustrating an architecture of a graphics processing apparatus according to a first embodiment of the present disclosure.

FIG. 1A is a block diagram illustrating an architecture of a graphics processing apparatus 100 according to a first embodiment of the present disclosure. As shown, the graphics processing apparatus 100 includes a processor 110, a drawing engine 120, a display engine 130, and a plurality of buffers 140-150. In this embodiment, two buffers 140 and 150 are utilized in the graphics processing apparatus 100. However, it should be noted that the number of buffers for the graphics processing apparatus 100 are for illustrative purposes only, and are not meant to be limitations of the present invention. Each of the buffer 140 and the buffer 150 is served as an on-screen buffer or an on-drawing buffer by turns. That is to say, during a current stage, the buffer 140 is served as an on-screen buffer and the buffer 150 is served as an on-drawing buffer; during a next stage, the buffer 150 is served as an on-screen buffer and the buffer 140 is served as an on-drawing buffer; and so on.

Please note that, in this embodiment, the processor 110 is arranged to send drawing commands CD1/CD2 related to the buffer 140/150 to the drawing engine 120, arranged to send an asynchronous flush command CFS1/CFS2 related to the buffer 140/150 to the drawing engine 120 in order to confirm that the drawing commands CD1/CD2 related to the buffer 140/150 are completed, and arranged to send an asynchronous flip command CFP1/CFP2 related to the buffer 140/150 to the display engine 130 in order to display the buffer 140/150 on a screen. The drawing engine 120 is coupled to the buffers 140-150 and the processor 110. The drawing engine 120 is arranged to draw graphic data stored in the buffer 140/150 when the drawing commands CD1/CD2 related to the respective buffer are received, arranged to flush the buffer 140/150, and arranged to send a first notice signal NS1 to notify the display engine 130 that the buffer 140/150 is capable of being flipped, which is the timing when the flush operation for respective buffer is completed. The display engine 130 is coupled to the buffers 140-150, the processor 110 and the drawing engine 120. The display engine 130 is arranged to receive the first notice signal NS1 from the drawing engine 120, arranged not to flip the buffer 140/150 under a condition that a vertical synchronization interrupt (VSYNC interrupt) is received but the first notice signal NS1 is not received or indicates that the flush command CFS1/CFS2 related to corresponding buffer is not completed yet, arranged to flip the buffer 140/150 under a condition that the Vsync interrupt VSYNC is received and the first notice signal NS1 is received or indicates the flush command CFS1/CFS2 related to corresponding buffer is completed, and arranged to send a second notice signal NS2 to notify the drawing engine 120 that the buffer 140/150 is flipped. Detailed operations of the processor 110, the drawing engine 120, and the display engine 130 will be given in the following embodiments.

Figure 1B:
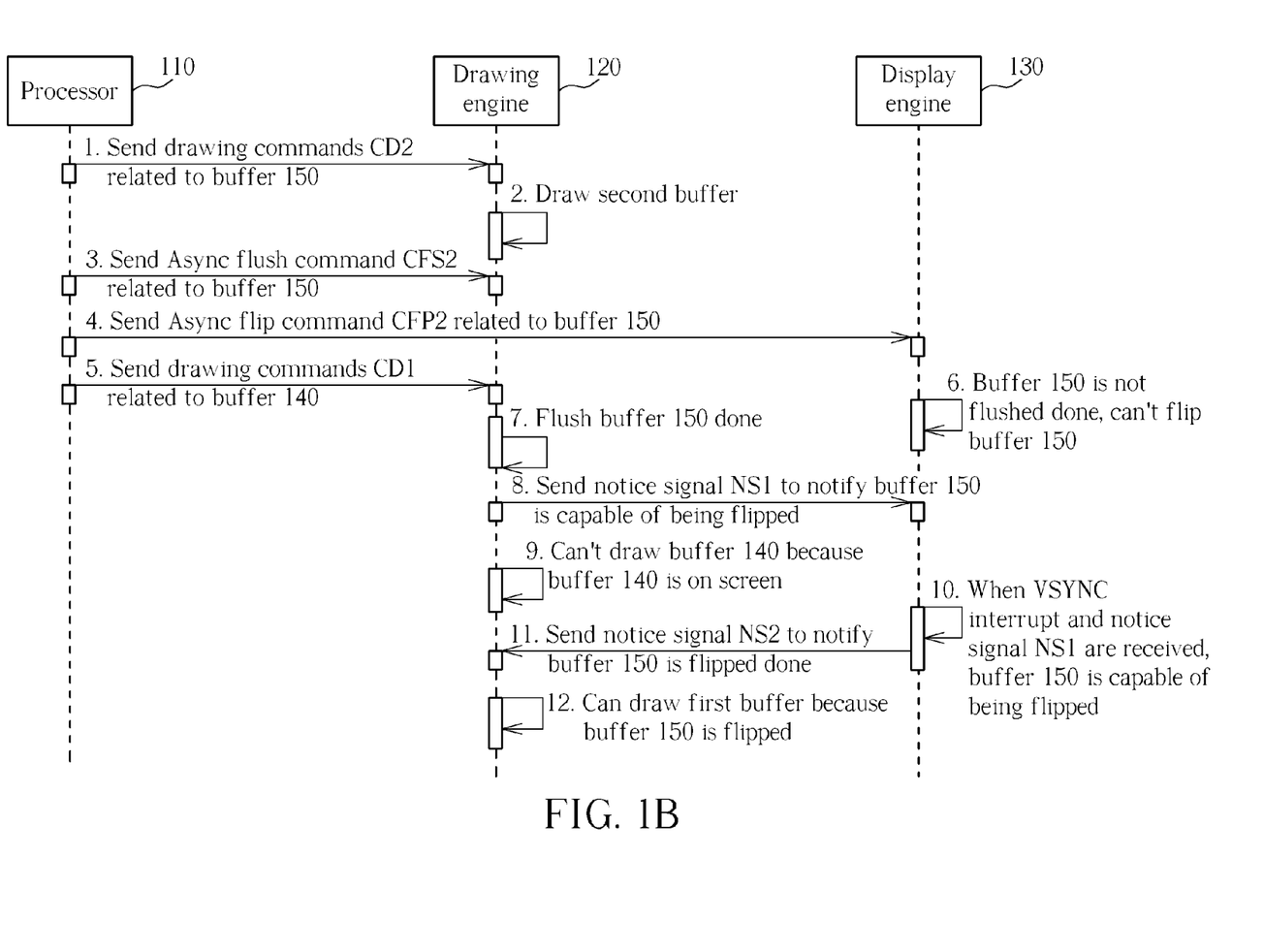
FIG. 1B is a diagram illustrating a double-buffer procedure according to a first embodiment of the present disclosure.

Please refer to FIG. 1B together with FIG. 1A. FIG. 1B is a diagram illustrating a double-buffer procedure according to an embodiment of the present disclosure. As mentioned above, during the current stage, the buffer 140 is served as an on-screen buffer and the buffer 150 is served as an on-drawing buffer. In FIG. 1B, the processor 110 sends drawing command CD2 related to the buffer 150 to the drawing engine 120. When the drawing command CD2 related to the buffer 150 are received, the drawing engine 120 draws graphic data stored in the buffer 150. After that, the processor 110 sends the asynchronous flush command CFS2 related to the buffer 150 to the drawing engine 120 in order to confirm that the drawing command CD2 related to the buffer 150 are completed, and then sends the asynchronous flip command CFP2 related to the buffer 150 to the display engine 130 in order to display the graphic data stored in the buffer 150 on a screen. Since each of the above-mentioned asynchronous flush command CFS2 and the asynchronous flip command CFP2 is an asynchronous command, a callback mechanism is not required, saving the time for waiting for the callback mechanism. Therefore, the processor 110 is not jammed and capable of continuing to send following commands. For example, the processor 110 can send drawing command CD1 related to the buffer 140 immediately.

After that, the drawing engine 120 flushes the buffer 150, and then sends the first notice signal NS1 to notify the display engine 130 that the buffer 150 is flushed and is thus capable of being flipped. In other words, the first notice signal NS1 indicates whether the buffer 150 is capable of being flipped or not. For this reason, under a condition that a VSYNC interrupt is received but the first notice signal NS1 is not received or indicates the buffer 150 has not been flushed completely, the display engine 130 cannot flip the buffer 150; under another condition that a VSYNC interrupt is received and the first notice signal NS1 is received or indicates that the buffer 150 is capable of being flipped, the display engine 130 can proceed to flip the buffer 150. After the buffer 150 is flipped, the display engine 130 sends a second notice signal NS2 to notify the drawing engine 120. At this time, the drawing engine 120 can draw graphic data stored in the buffer 140. Please note that the second notice signal NS2 indicates whether the buffer 150 has been flipped or not. For this reason, under a condition that the second notice signal NS2 is not received, the drawing engine 120 cannot draw the graphic data stored in the buffer 140 because the buffer 140 is on screen; under another condition that the second notice signal NS2 is received or indicates that the buffer 150 has been flipped, the drawing engine can draw the graphic data stored in the buffer 140.

As a person skilled in the art can readily understand the following operations of the drawing command CD1 after reading above paragraphs directed to the drawing and display of the graphic data stored in the buffer 150, further description is omitted here for brevity.

Figure 2A:
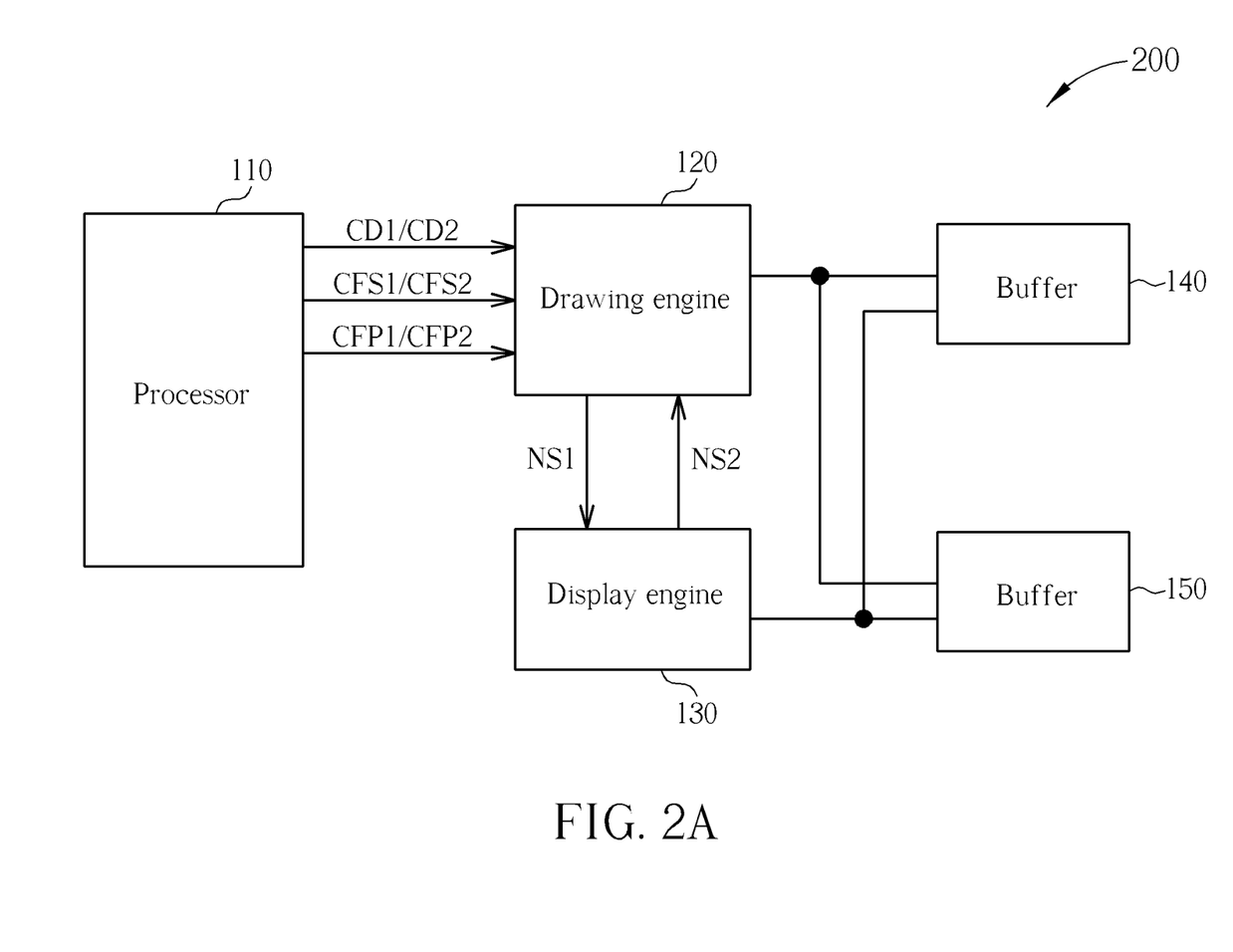
FIG. 2A is a block diagram illustrating an architecture of a graphics processing apparatus according to a second embodiment of the present disclosure.

FIG. 2A is a block diagram illustrating an architecture of a graphics processing apparatus 200 according to a second embodiment of the present disclosure. The architecture of the graphics processing apparatus 200 shown in FIG. 2A is similar to that of the graphics processing apparatus 100 shown in FIG. 1A, and the major difference between them is that: the processor 110 of the graphics processing apparatus 200 is arranged to send the asynchronous flip command CFP1/CFP2 related to the buffer 140/150 to the drawing engine 120, rather than to the display engine 130.

Figure 2B:
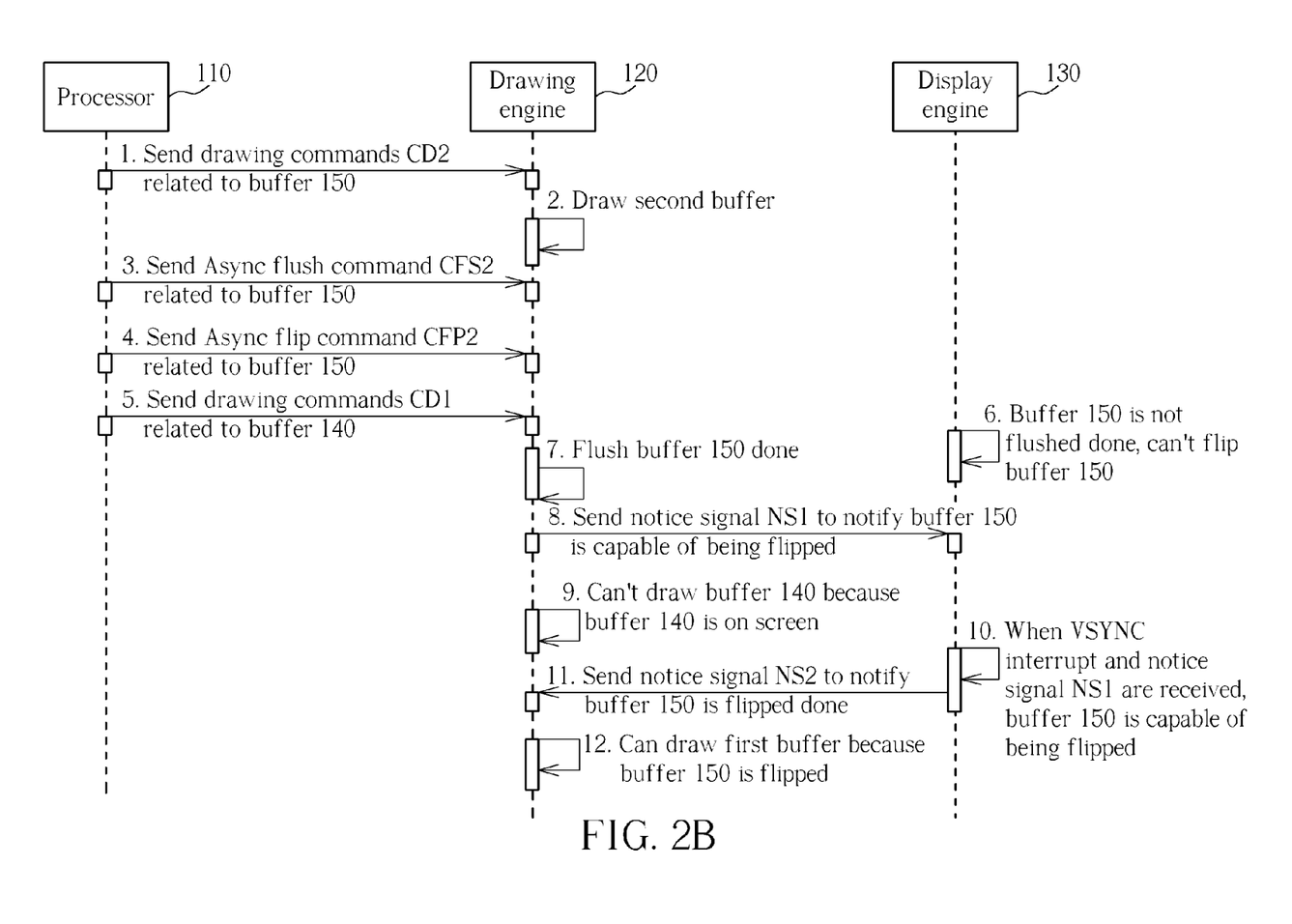
FIG. 2B is a diagram illustrating a double-buffer procedure according to a second embodiment of the present disclosure.

Please refer to FIG. 2B together with FIG. 1B and FIG. 2A. FIG. 2B is a diagram illustrating a double-buffer procedure according to another embodiment of the present disclosure. In FIG. 2B, the double-buffer procedure is similar to that shown in FIG. 1B, and the major difference between them is that: in step 4, the processor 110 sends the asynchronous flip command CFP2 related to the buffer 150 to the drawing engine 120, rather than to the display engine 130. In step 8, after the drawing engine 120 flushes the buffer 150, the drawing engine 120 then sends the first notice signal NS1 to notify the display engine 130 that the buffer 150 is capable of being flipped. In this case, the drawing engine 120 receives the asynchronous flip command CFP2 related to the buffer 150 and sends the first notice signal NS1 to the display engine 130 according to whether the flush command related to the buffer 150 is completed, wherein the first notice signal NS1 is acting like a flip command, allowing the display engine 130 to flip respective buffer.

As one can see, for a double-buffer procedure, conventional synchronous flush/flip commands are replaced by using asynchronous flush/flip commands in order to save the time for the callback mechanism. Further, the processor 110 is not jammed and capable of continuing to send following commands. As a result, the performance of the double-buffer procedure can be substantially improved. As an illustration, the frame rate of the double-buffer procedure is improved from 10 fps to 24 fps.

Figure 3A:
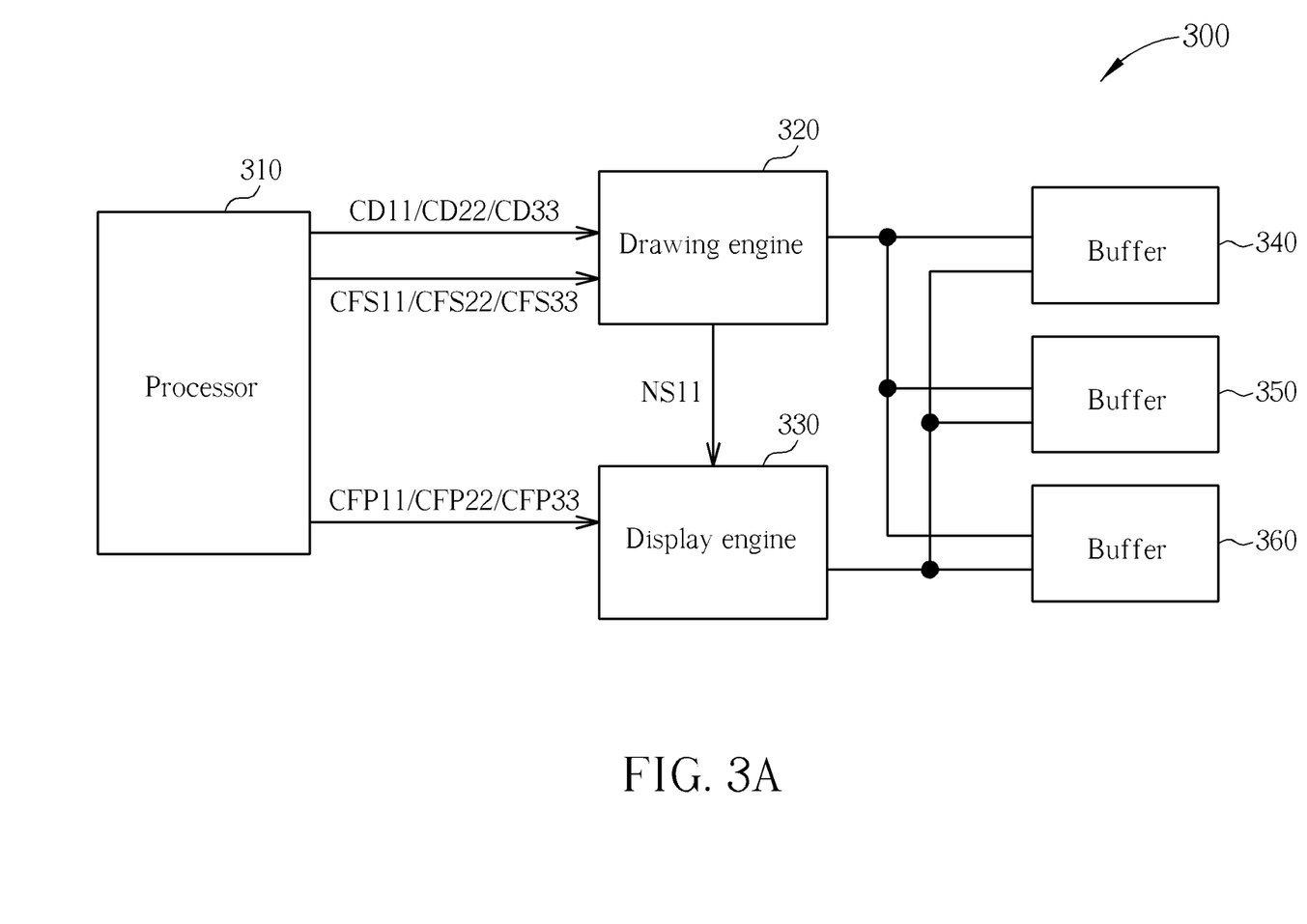
FIG. 3A is a block diagram illustrating an architecture of a graphics processing apparatus according to a third embodiment of the present disclosure.

FIG. 3A is a block diagram illustrating an architecture of a graphics processing apparatus 300 according to a second embodiment of the present disclosure. As shown, the graphics processing apparatus 300 includes a processor 310, a drawing engine 320, a display engine 330, and a plurality of buffers 340-360. In this embodiment, three buffers 340, 350, and 360 are utilized in the graphics processing apparatus 300. However, it should be noted that the number of buffers for the graphics processing apparatus 300 are for illustrative purposes only, and are not meant to be limitations of the present invention. Each of the buffers 340-360 is served as an on-screen buffer or an on-drawing buffer by turns. That is to say, during a current stage, the buffer 340 is served as an on-screen buffer, the buffer 350 is served as an on-drawing buffer, and the buffer 360 is served as a standby buffer to be drawn next; during a next stage, the buffer 350 is served as an on-screen buffer, the buffer 360 is served as an on-drawing buffer, and the buffer 340 is served as a standby buffer to be drawn next; during a still next stage, the buffer 360 is served as an on-screen buffer, the buffer 340 is served as an on-drawing buffer, and the buffer 350 is served as a standby buffer to be drawn next; and so on.

The architecture of the graphics processing apparatus 300 is similar to that of the graphics processing apparatus 100 shown in FIG. 1A and the major difference is that the graphics processing apparatus 300 includes three buffers 340-360. The processor 310 is arranged to send drawing commands CD11/CD22/CD33 and asynchronous flush commands CFS11/CFS22/CFS33 to the drawing engine 320, and arranged to send asynchronous flip commands CFP11/CFP22/CFP33 to the display engine 320. Additionally, detailed operations of the processor 310, the drawing engine 320, and the display engine 330 will be described in the following.

Figure 3B:
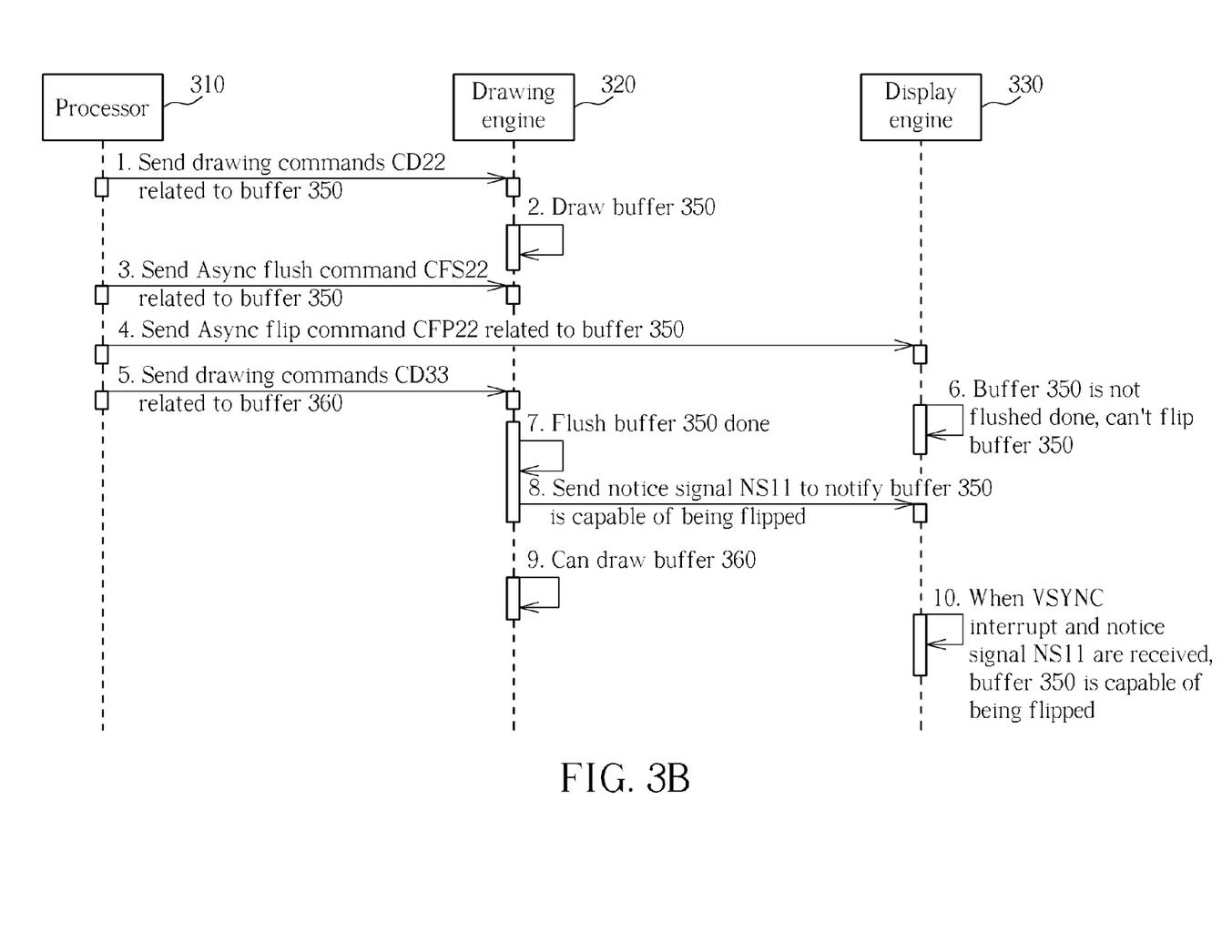
FIG. 3B is a diagram illustrating a triple-buffer procedure according to a third embodiment of the present disclosure.
Figure 4A:
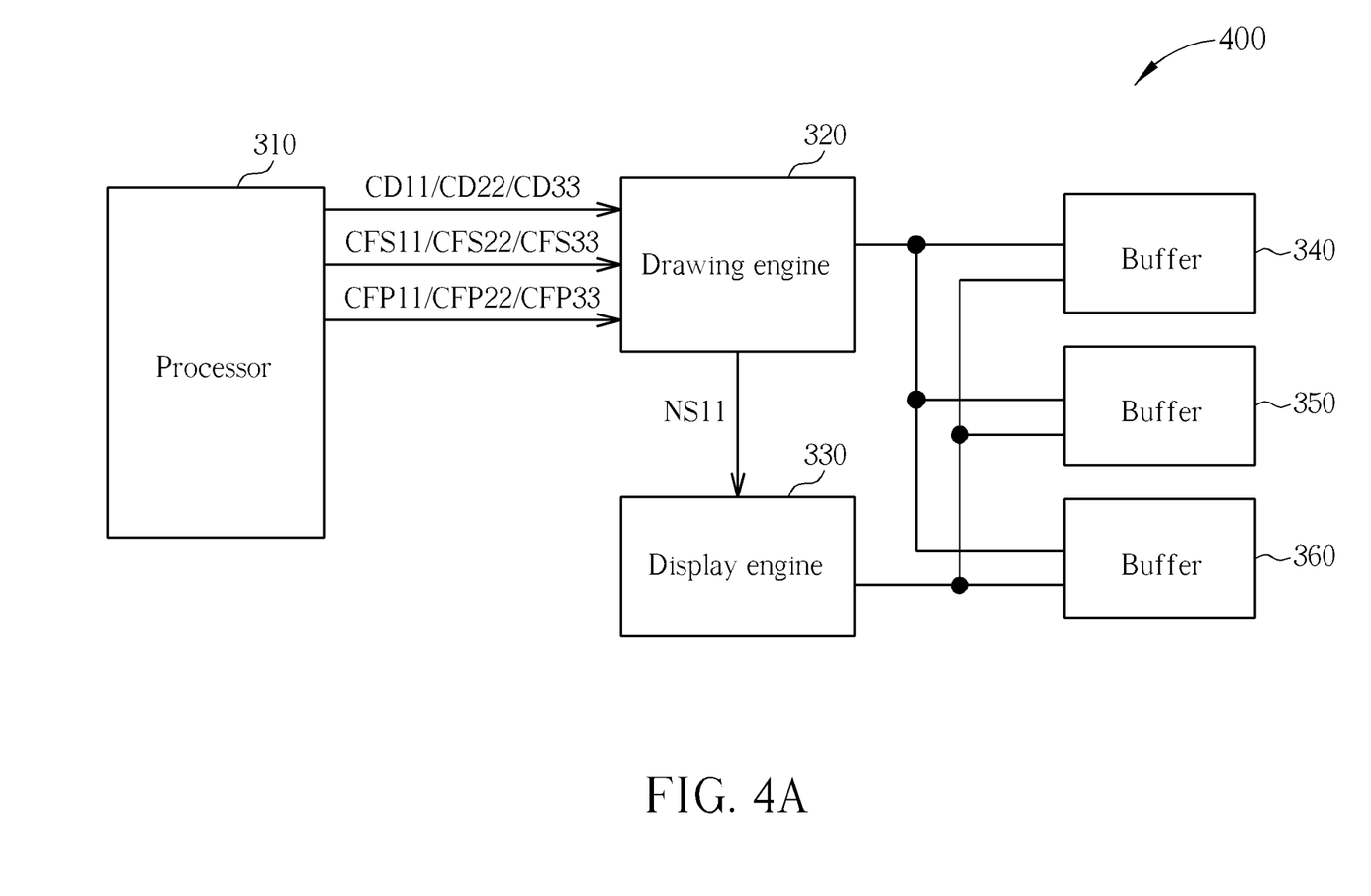
FIG. 4A is a block diagram illustrating an architecture of a graphics processing apparatus according to a fourth embodiment of the present disclosure.

Please refer to FIG. 3B together with FIG. 3A. FIG. 3B is a diagram illustrating a triple-buffer procedure according to an embodiment of the present disclosure. As mentioned above, during the current stage, the buffer 340 is served as an on-screen buffer, the buffer 350 is served as an on-drawing buffer, and the buffer 360 is served as a standby buffer to be drawn next. In FIG. 4A, the processor 310 sends a drawing command CD22 related to the buffer 350 to the drawing engine 320. When the drawing command CD22 related to the buffer 350 are received, the drawing engine 320 draws graphic data stored in the buffer 350. The processor 310 proceeds to send an asynchronous flush command CFS22 related to the buffer 350 to the drawing engine 320 in order to confirm whether the drawing command CD22 related to the buffer 350 are completed, and then send an asynchronous flip command CFP22 related to the buffer 350 to the display engine 330 in order to display the graphic data stored in the buffer 350 on a screen. Since each of the above-mentioned commands CFS22 and CFP22 is an asynchronous command, a callback mechanism is not required, saving the time for waiting for the callback mechanism. Therefore, the processor 310 is not jammed and capable of continuing to send following commands. For example, the processor 310 can send drawing command CD33 related to the buffer 360 immediately.

After that, the drawing engine 320 flushes the buffer 350, and then sends a first notice signal NS11 to notify the display engine 330 that the buffer 350 is flushed and is thus capable of being flipped. In other words, the first notice signal NS11 indicates whether the buffer 350 is capable of being flipped or not. For this reason, under a condition that a VSYNC interrupt is received but the first notice signal NS11 is not received or indicates that the buffer 350 has not been flushed completely and thus can't be flipped, the display engine 330 cannot flip the buffer 350; under another condition that a VSYNC interrupt is received and the first notice signal NS11 is received or indicates that the buffer 350 has been flushed and is capable of being flipped, the display engine 330 can proceed to flip the buffer 350. After the buffer 350 is flushed, the drawing engine 320 can start to draw graphic data stored in the buffer 360.

As a person skilled in the art can readily understand the following operations of the drawing command CD133 after reading above paragraphs directed to the drawing and display of the graphic data stored in the buffer 350, further description is omitted here for brevity.

FIG. 4A is a block diagram illustrating an architecture of a graphics processing apparatus 400 according to a fourth embodiment of the present disclosure. The architecture of the graphics processing apparatus 400 shown in FIG. 4A is similar to that of the graphics processing apparatus 300 shown in FIG. 3A and the major difference is that the processor 310 of the graphics processing apparatus 400 is arranged to send the asynchronous flip command CFP11/CFP22/CFP33 related to the buffer 340/350/360 to the drawing engine 320, rather than to the display engine 330. The processor 310 is still arranged to send the drawing command CD11/CD22/CD33 and the asynchronous flush command CFS11/CFS22/CFS33 to the drawing engine 320.

Figure 4B:
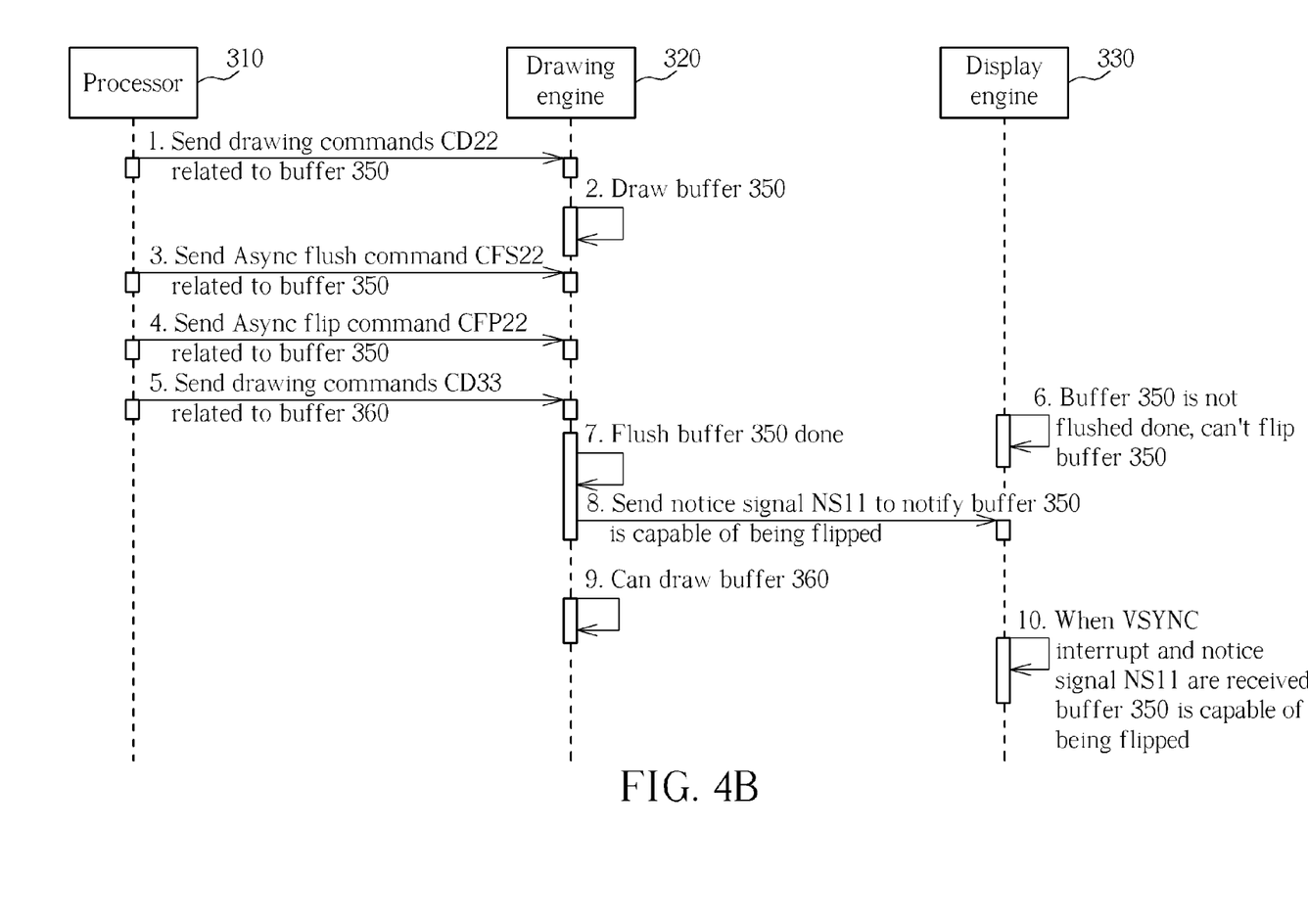
FIG. 4B is a diagram illustrating a triple-buffer procedure according to a fourth embodiment of the present disclosure.

Please refer to FIG. 4B together with FIG. 3B and FIG. 4A. FIG. 4B is a diagram illustrating a triple-buffer procedure according to another embodiment of the present disclosure. In FIG. 4B, the triple-buffer procedure is similar to that shown in FIG. 3B, and the major difference between them is that: in step 4, the processor 310 sends the asynchronous flip command CFP22 related to the buffer 350 to the drawing engine 320, rather than to the display engine 330. In step 8, after the drawing engine 320 flushes the buffer 350, the drawing engine 320 then sends the first notice signal NS11 to notify the display engine 330 that the buffer 350 is capable of being flipped. Similarly, in this case, the drawing engine 320 receives the asynchronous flip command CFP2 related to the buffer 350 and sends the first notice signal NS11 to the display engine 330 according to whether the flush command related to the buffer 350 is completed, wherein the first notice signal NS11 is acting like a flip command, allowing the display engine 330 to flip respective buffer.

As one can see, for a triple-buffer procedure, conventional synchronous flush commands are replaced by using asynchronous flush commands in order to save the time for the callback mechanism. Further, the processor 310 is not jammed and capable of continuing to send following commands. As a result, the performance of the triple-buffer procedure can be substantially improved. As an illustration, the frame rate of the triple-buffer procedure is improved from 20 fps to 37 fps.

Please note that the above-mentioned graphics processing apparatus 100, 200, 300 and 400 may be implemented in a television or a BD player, but the present disclosure is not limited to this only. In addition, each of the drawing engine 120/320 and the display engine 130/330 may be implemented by software, hardware, or firmware. Those skilled in the art should appreciate that various modifications of achieving the functions of the drawing engine 120/320 and the display engine 130/330 shown in FIG. 1A, FIG. 2A, FIG. 3A or FIG. 4A may be made without departing from the spirit of the present invention.

Figure 5:
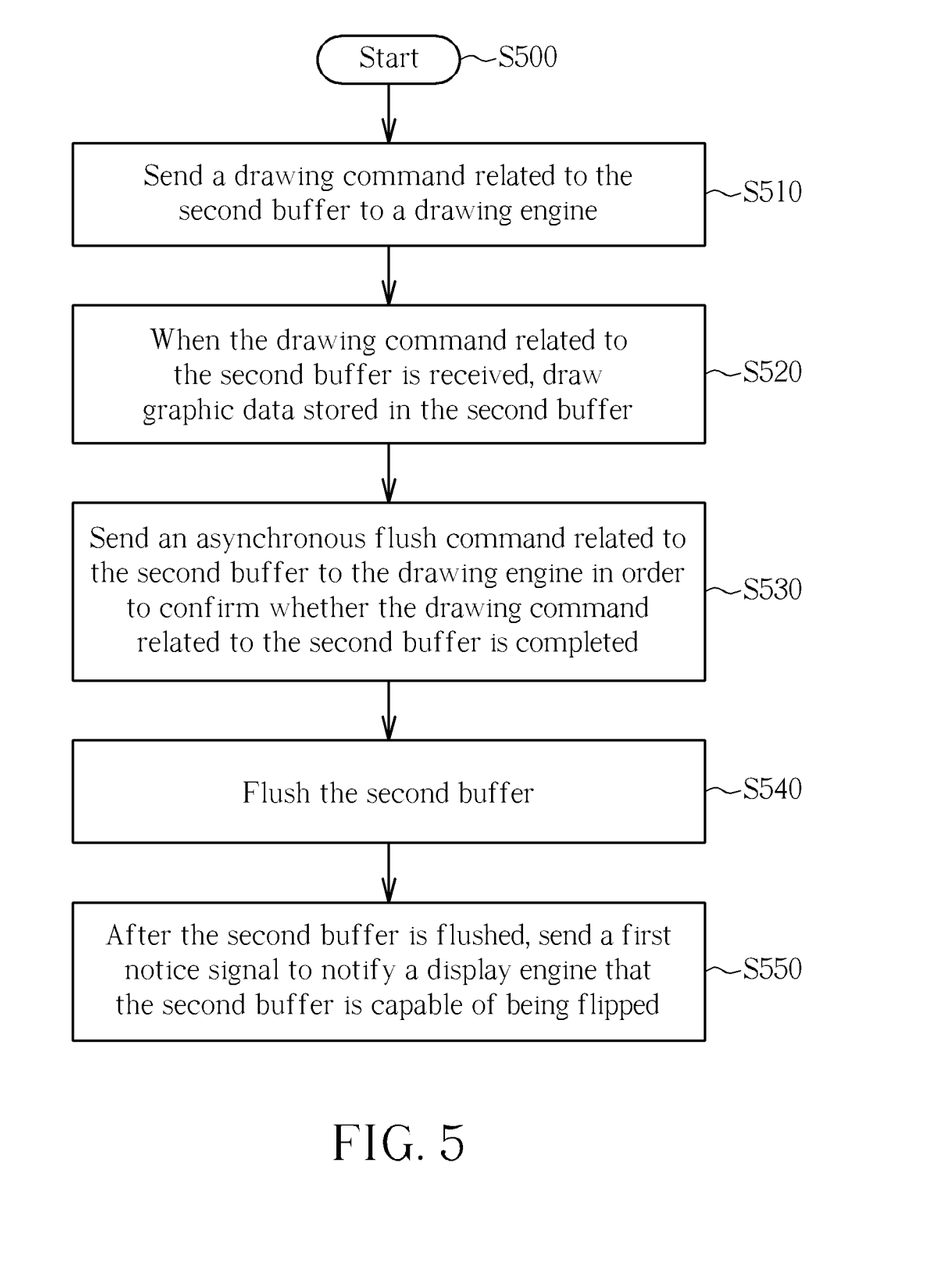
FIG. 5 is a flowchart illustrating a graphics processing method according to an exemplary embodiment of the present disclosure.

FIG. 5 is a flowchart illustrating a generalized graphics processing method according to an exemplary embodiment of the present disclosure. Please note that the steps are not required to be executed in the exact order shown in FIG. 5, provided that the result is substantially the same. The generalized graphics processing method includes following steps:

Step S500: Start.

Step S510: Send a drawing command related to the second buffer to a drawing engine.

Step S520: When the drawing command related to the second buffer is received, draw graphic data stored in the second buffer.

Step S530: Send an asynchronous flush command related to the second buffer to the drawing engine in order to confirm whether the drawing command related to the second buffer is completed.

Step S540: Flush the second buffer.

Step S550: After the second buffer is flushed, send a first notice signal to notify a display engine that the second buffer is capable of being flipped.

As a person skilled in the art can readily understand the details of the steps in FIG. 5 after reading above paragraphs directed to the graphics processing apparatuses 100, 200, 300 and 400, further description is omitted here for brevity. What calls for special attention is that the steps of the flowchart shown in FIG. 5 can be used for both a double-buffer procedure and a triple-buffer procedure. In this embodiment, the flowchart is focused on steps related to the asynchronous flush commands. Here, the steps 5510 and 5530 can be executed by the processor 110/310; and the steps 5520, 5540 and 5550 can be executed by the drawing engine 120/320.

Figure 6:
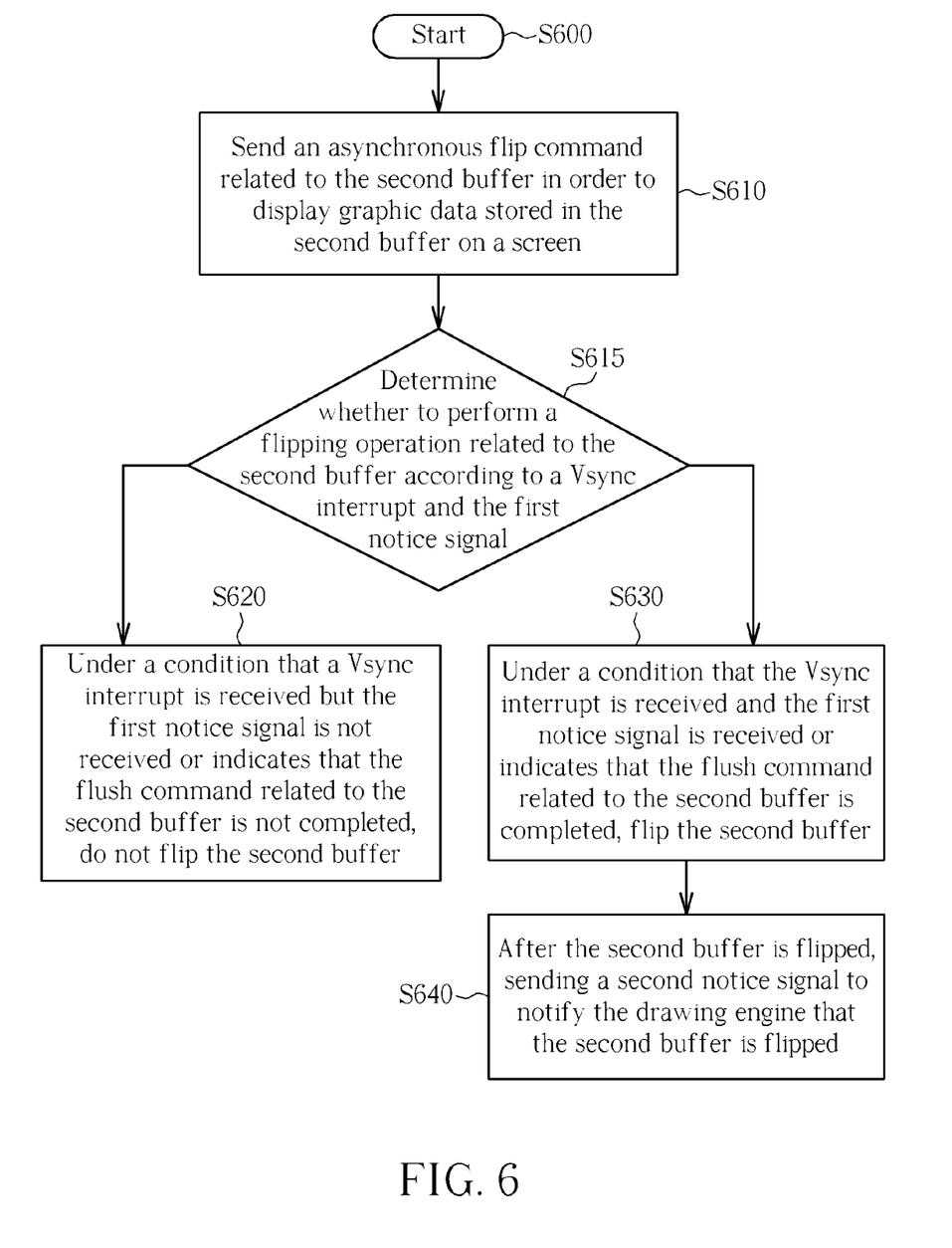
FIG. 6 is a flowchart illustrating a graphics processing method according to another exemplary embodiment of the present disclosure.

FIG. 6 is a flowchart illustrating a graphics processing method according to another exemplary embodiment of the present disclosure. The method includes, but is not limited to, the following steps:

Step S600: Start.

Step S610: Send an asynchronous flip command related to the second buffer in order to display graphic data stored in the second buffer on a screen.

Step S615: Determine whether to perform a flipping operation related to the second buffer according to a Vsync interrupt and the first notice signal. Under a condition that a Vsync interrupt is received but the first notice signal is not received or indicates that the flush command related to the second buffer is not completed, go to step S620; under a condition that the Vsync interrupt is received and the first notice signal is received or indicates that the flush command related to the second buffer is completed, go to step S630.

Step S620: Under a condition that a Vsync interrupt is received but the first notice signal is not received or indicates that the flush command related to the second buffer is not completed, do not flip the second buffer.

Step S630: Under a condition that the Vsync interrupt is received and the first notice signal is received or indicates that the flush command related to the second buffer is completed, flip the second buffer.

Step S640: After the second buffer is flipped, sending a second notice signal to notify the drawing engine that the second buffer is flipped.

As a person skilled in the art can readily understand the details of the steps in FIG. 6 after reading above paragraphs directed to the graphics processing apparatuses 100, 200, 300 and 400, further description is omitted here for brevity. What calls for special attention is that the steps of the flowchart shown in FIG. 6 may be used in a double-buffer procedure. In this embodiment, the flowchart is focused on steps related to the asynchronous flip commands only. Herein the step S610 can be executed by the processor 110; and the steps S620, S630 and S640 can be executed by the display engine 130.

Figure 7:
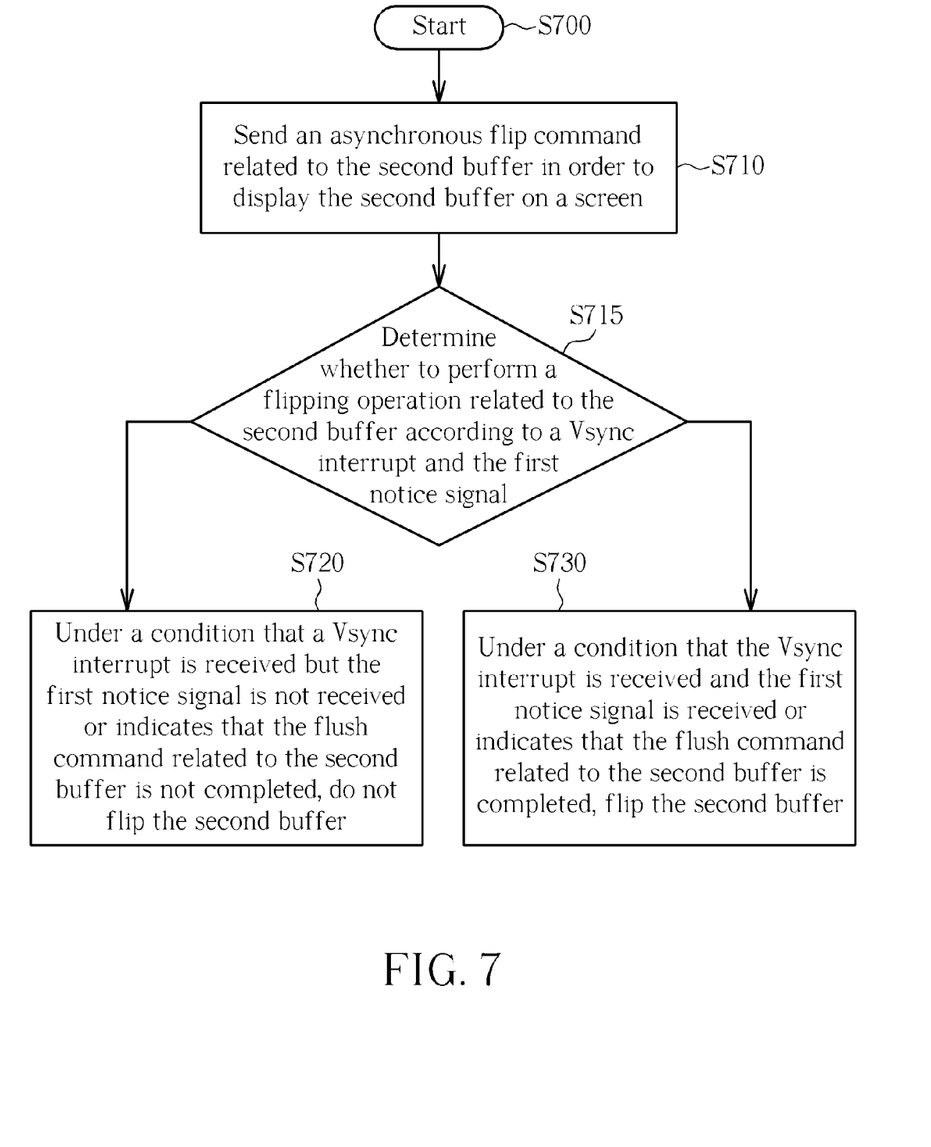
FIG. 7 is a flowchart illustrating a graphics processing method according to still another exemplary embodiment of the present disclosure.

FIG. 7 is a flowchart illustrating a graphics processing method according to still another exemplary embodiment of the present disclosure. The method includes, but is not limited to, the following steps:

Step S700: Start.

Step S710: Send an asynchronous flip command related to the second buffer in order to display the second buffer on a screen.

Step S715: Determine whether to perform a flipping operation related to the second buffer according to a Vsync interrupt and the first notice signal. Under a condition that a Vsync interrupt is received but the first notice signal is not received or indicates that the flush command related to the second buffer is not completed, go to step S720; under a condition that the Vsync interrupt is received and the first notice signal is received or indicates that the flush command related to the second buffer is completed, go to step S730.

Step S720: Under a condition that a Vsync interrupt is received but the first notice signal is not received or indicates that the flush command related to the second buffer is not completed, do not flip the second buffer.

Step S730: Under a condition that the Vsync interrupt is received and the first notice signal is received or indicates that the flush command related to the second buffer is completed, flip the second buffer.

As a person skilled in the art can readily understand the details of the steps in FIG. 7 after reading above paragraphs directed to the graphics processing apparatuses 100, 200, 300 and 400, further description is omitted here for brevity. Taking the graphics processing apparatus 300 as an example, the step S710 can be executed by the processor 310; and the steps 5720 and 5730 can be executed by the display engine 330.

The above-mentioned embodiments are presented merely for describing features of the present disclosure, and in no way should be considered to be limitations of the scope of the present disclosure. In summary, the present disclosure provides a graphics processing method applied to a plurality of buffers and a related graphics processing apparatus. By using asynchronous flush/flip commands, the time for the callback mechanism can be avoided. In addition, the callback mechanism can be replaced and achieved by communications between the drawing engine 120/320 and the display engine 130/330, such as the first notice signal NS1/NS11 and/or the second notice signal NS2. Therefore, the processor 110/310 won't be jammed and is capable of continuing to send following commands. Please note that the graphics processing method and related apparatus disclosed in the present disclosure can be suitable for a double-buffer procedure, a triple-buffer procedure, and a multiple-buffer procedure. That is, a number of the plurality of buffers may be equal to two or greater than two, which also belongs to the scope of the present disclosure.

Those skilled in the art will readily observe that numerous modifications and alterations of the device and method may be made while retaining the teachings of the invention.

What is claimed is:

1. A graphics processing method, applied to a plurality of buffers including at least a first buffer served as an on-screen buffer and a second buffer served as an on-drawing buffer, the method comprising the following steps:

sending a drawing command related to the second buffer to a drawing engine;

when the drawing command related to the second buffer is received, drawing graphic data stored in the second buffer;

sending an asynchronous flush command related to the second buffer to the drawing engine in order to confirm whether the drawing command related to the second buffer is completed;

flushing the second buffer; and after the second buffer is flushed, sending a first notice signal to notify a display engine that the second buffer is capable of being flipped.

2. The graphics processing method of claim 1, further comprising:

sending an asynchronous flip command related to the second buffer in order to display the graphic data stored in the second buffer on a screen;

determining whether to perform a flipping operation related to the second buffer in response to the asynchronous flip command related to the second buffer according to a vertical synchronization (Vsync) interrupt and the first notice signal; and after the second buffer is flipped, sending a second notice signal to notify the drawing engine that the second buffer is flipped.

3. The graphics processing method of claim 2, wherein the step of determining whether to perform the flipping operation related to the second buffer according to the Vsync interrupt and the first notice signal comprises:

under a condition that the Vsync interrupt is received but the first notice signal is not received or indicates that the flush command related to the second buffer is not completed, not flipping the second buffer; and under a condition that the Vsync interrupt is received and the first notice signal is received or indicates that the flush command related to the second buffer is completed, flipping the second buffer.

4. The graphics processing method of claim 2, further comprising:

sending a drawing command related to the first buffer to the drawing engine;

under a condition that the second notice signal is not received or indicates that the second buffer has not been flipped, not drawing graphic data stored in the first buffer; and under a condition that the second notice signal is received or indicates that the second buffer has been flipped, drawing the graphic data stored in the first buffer.

5. The graphics processing method of claim 1, wherein the plurality of buffers further includes a third buffer served as a standby buffer to be drawn next to the second buffer, and the method further comprises:

sending an asynchronous flip command related to the second buffer in order to display the graphic data stored in the second buffer on a screen;

determining whether to perform a flipping operation related to the second buffer in response to the asynchronous flip command related to the second buffer according to a Vsync interrupt and the first notice signal.

6. The graphics processing method of claim 5, wherein the step of determining whether to perform the flipping operation related to the second buffer according to the Vsync interrupt and the first notice signal comprises:

under a condition that the Vsync interrupt is received but the first notice signal is not received or indicates that the flush command related to the second buffer is not completed, not flipping the second buffer; and under a condition that the Vsync interrupt is received and the first notice signal is received or indicates that the flush command related to the second buffer is completed, flipping the second buffer.

7. The graphics processing method of claim 5, further comprising:

sending a drawing command related to the third buffer to the drawing engine; and when the drawing command related to the third buffer is received, drawing graphic data stored in the third buffer.

8. A graphics processing apparatus, comprising:

a plurality of buffers, comprising at least a first buffer served as an on-screen buffer and a second buffer served as an on-drawing buffer;

a processor, arranged to send a drawing command related to the second buffer, and arranged to send an asynchronous flush command related to the second buffer in order to confirm whether the drawing command related to the second buffer is completed;

a drawing engine, coupled to the buffers and the processor, arranged to draw graphic data stored in the second buffer when the drawing command related to the second buffer is received, flush the second buffer, and send a first notice signal for notifying that the second buffer is capable of being flipped; and a display engine, coupled to the buffers, the processor and the drawing engine, for receiving the first notice signal from the drawing engine.

9. The graphics processing apparatus of claim 8, wherein:

the processor is further arranged to send an asynchronous flip command related to the second buffer in order to display the graphic data stored in the second buffer on a screen; and the display engine is further arranged to determine whether to perform a flipping operation related to the second buffer according to a Vsync interrupt and the first notice signal, and arranged to send a second notice signal to notify the drawing engine that the second buffer is flipped.

10. The graphics processing apparatus of claim 9, wherein:

under a condition that the Vsync interrupt is received but the first notice signal is not received or indicates that the flush command related to the second buffer is not completed, the display engine does not flip the second buffer; and under a condition that the Vsync interrupt is received and the first notice signal is received or indicates that the flush command related to the second buffer is completed, the display engine flips the second buffer.

11. The graphics processing apparatus of claim 9, wherein:

the processor is further arranged to send a drawing command related to the first buffer to the drawing engine; and when receiving he drawing command related to the first buffer, the drawing engine is further arranged to stop drawing graphic data stored in the first buffer under a condition that the second notice signal is not received or indicates that the second buffer has not been flipped, and arranged to draw the graphic data stored in the first buffer under a condition that the second notice signal is received or indicates that the second buffer has been flipped.

12. The graphics processing apparatus of claim 8, wherein:

the buffers further comprise a third buffer served as a standby buffer to be drawn next to the second buffer;

the processor is further arranged to send an asynchronous flip command related to the second buffer in order to display the graphic data stored in the second buffer on a screen; and the display engine is further arranged to determine whether to perform a flipping operation related to the second buffer according to a Vsync interrupt and the first notice signal.

13. The graphics processing apparatus of claim 12, wherein:

under a condition that the Vsync interrupt is received but the first notice signal is not received or indicates that the flush command related to the second buffer is not completed, the display engine does not flip the second buffer; and under a condition that the Vsync interrupt is received and the first notice signal is received or indicates that the flush command related to the second buffer is completed, the display engine flips the second buffer.

14. The graphics processing apparatus of claim 12, wherein:

the processor is further arranged to send a drawing command related to the third buffer to the drawing engine; and the drawing engine is further arranged to draw graphic data stored in the third buffer when the drawing command related to the third buffer is received.

15. A graphics processing method, applied to a drawing engine and a plurality of buffers including at least a first buffer served as an on-screen buffer and a second buffer served as an on-drawing buffer, the method comprising the following steps:

receiving a drawing command related to the second buffer; drawing graphic data stored in the second buffer;

receiving an asynchronous flush command related to the second buffer in order to confirm whether the drawing command related to the second buffer is completed; and sending a first notice signal according to the confirming result.

16. The graphics processing method of claim 15, wherein the first notice signal is sent to a display engine for notifying whether the second buffer is capable of being flipped.

17. The graphics processing method of claim 16, further comprising:

receiving an asynchronous flip command related to the second buffer, wherein the display engine displays the graphic data stored in the second buffer on a screen in response to the asynchronous flip command related to the second buffer according to the first notice signal.

18. The graphics processing method of claim 16, wherein the display engine displays the graphic data stored in the second buffer on a screen according to the first notice signal when receiving an asynchronous flip command related to the second buffer.

19. The graphics processing method of claim 18, wherein when receiving the asynchronous flip command related to the second buffer, the display engine displays the graphic data stored in the second buffer on a screen when a Vsync interrupt is received and the first notice signal indicates that the second buffer is capable of being flipped.

20. The graphics processing method of claim 19, wherein the display engine further sends a second notice signal for indicating whether the second buffer is flipped.

21. The graphics processing method of claim 18, further comprising:

receiving a drawing command related to the first buffer; and drawing graphic data stored in the first buffer according to a second notice signal for indicating whether the second buffer is flipped.

22. The graphics processing method of claim 21, wherein the second notice signal is sent by a display engine.

23. The graphics processing method of claim 21, wherein the drawing engine draws graphic data stored in the first buffer when the second notice signal indicates that the second buffer is flipped.

24. The graphics processing method of claim 15, wherein the plurality of buffers further includes a third buffer served as a standby buffer to be drawn next to the second buffer, and the method further comprises:

receiving a drawing command related to the third buffer; and drawing graphic data stored in the third buffer.

\* \* \* \* \*